United States Patent [19]

Katayama et al.

[11] E Re. 28,779

[45] Reissued Apr. 20, 1976

[54] OIL-CONTAINING MICROCAPSULES AND METHOD FOR THEIR PRODUCTION

[75] Inventors: Shizuo Katayama; Hiroharu Matsukawa, both of Fujimiya; Junichi Matsuyama, Minami-ashigara; Masaya Yamamoto, Tokyo, all of Japan

[73] Assignee: Fuji Photo Film Co., Ltd., Minami-ashigara, Japan

[22] Filed: Aug. 30, 1973

[21] Appl. No.: 393,254

Related U.S. Patent Documents

Reissue of:

[64] Patent No.: 3,687,865
Issued: Aug. 29, 1972
Appl. No.: 848,411
Filed: Aug. 4, 1969

[30] Foreign Application Priority Data

| | | |
|---|---|---|
| Aug. 3, 1968 | Japan | 43-55014 |
| Sept. 13, 1968 | Japan | 43-65939 |
| Sept. 17, 1968 | Japan | 43-67130 |
| Apr. 25, 1969 | Japan | 44-32221 |
| Apr. 25, 1969 | Japan | 44-32222 |
| May 10, 1969 | Japan | 44-35900 |
| May 10, 1969 | Japan | 44-35901 |

[52] U.S. Cl. ..... 252/316; 264/4; 427/151; 427/220; 427/338; 428/307

[51] Int. Cl.[2] ..... B01J 13/02; B44D 1/44

[58] Field of Search ..... 252/316; 117/100 A, 117/62.2; 424/37; 264/4; 427/338

[56] References Cited

UNITED STATES PATENTS

| | | | |
|---|---|---|---|
| 2,651,883 | 9/1953 | Hedrick et al. | 260/41 X |
| 2,800,457 | 7/1957 | Green et al. | 252/316 |
| 2,969,331 | 1/1961 | Brynko et al. | 252/316 |
| 3,494,872 | 2/1970 | Maierson et al. | 252/316 |

*Primary Examiner*—Richard D. Lovering
*Attorney, Agent, or Firm*—Sughrue, Rothwell, Mion, Zinn & Macpeak

[57] ABSTRACT

Method of producing microcapsules containing hydrophobic oily liquid, which comprises, in producing microcapsules by complex coacervation, using gelatin, as at least one hydrophilic colloid, adding an aqueous solution of shock preventing agent at a temperature lower than the gelling point of gelatin in order to prevent a rise in viscosity due to reaction of gelatin and aldehyde during hardening pretreatment and rapidly accomplishing hardening pretreatment.

31 Claims, No Drawings

OIL-CONTAINING MICROCAPSULES AND METHOD FOR THEIR PRODUCTION

Matter enclosed in heavy brackets [ ] appears in the original patent but forms no part of this reissue specification; matter printed in italics indicates the additions made by reissue.

BACKGROUND OF THE INVENTION

Field of the Invention

This invention relates to a method of producing oil-containing microcapsules.

DISCUSSION OF THE PRIOR ART

Known methods of producing microcapsules containing a hydrophobic oily liquid are disclosed in, for example, U.S. Pat. No. 2,800,457 and Japanese patent publication No. 3,875/62. The method of U.S. Pat. No. 2,800,457 comprises the steps of (1) emulsifying a water-immiscible oil in an aqueous solution of hydrophilic colloid to be ionized in water (first sol) (emulsification step), (2) admixing an aqueous solution of hydrophilic colloid to be ionized in water and having the opposite charge to the colloid of the first sol (second sol) in the emulsion of (1) and either adding water thereto or adjusting the pH thereof to cause coacervation, thus obtaining coacervates wherein the complex colloid is fixed to the individual oil drops (coacervation step), (3) cooling the coacervates to cause gelation thereof (gelation step) and (4) adding a hardening agent and adjusting the pH to 9–11 (hardening pretreatment). mononuclear microcapsule cannot be prepared by this method, regardless of the statement in the specification that the size of the microcapsule assembly decreases with the decrease of the amount of water used. Therefore, the control of the microcapsule size is limited to a range of 20–30 microns when the oil drop size is within a range of 5–6 microns.

The method of Japanese patent publication No. 3,785/62 is characterized by, in the step (1) of U.S. Pat. No. 2,800,457, i.e., the emulsification step, adding a thickener, such as acacia, tragacanth, methyl cellulose, carboxymethyl cellulose, magnesium aluminum silicate, polyglycol glycerine and syrup so as to accumulate hydrophilic colloid round oil drops. In accordance with this method, the coacervation can only be effected in a higher concentration colloid than in U.S. Pat. No. 2,800,457. Further, mononuclear microcapsules cannot be prepared by this method, even though such thickener is caused to be co-existent with oil drops prior to the coacervation step to thus change the surface character of the emulified drop. The reason for this is that the grain size of the microcapsule is already determined by the setting condition of coacervation, and the microcapsules are shocked during pretreatment for hardening the coacervate walls even if an insufficient coacervation system is set.

Microcapsules containing an oily liquid, prepared by these methods, are grape-bunch shaped, polynuclear microcapsules, which have, however, the disadvantage, due to their large size, of worsening the resolving power of colored letters in the copying of a plurality of sheets when used on pressure-sensitive copying paper utilizing a reaction between a leuco dye and clay.

"Mononuclear," in the context of this specification, refers to a single emulsified oil drop, and "polynuclear" refers to assembled emulsified oil drops.

Furthermore, when microcapsules prepared by these methods are applied to papers by the air knife coating method, there occurs a classifying action of the microcapsules caused by the air pressure of the coating machine, which results in a change in the liquid composition. Therefore, the air pressure must be raised, thus interfering with the use of high coating speeds.

SUMMARY OF THE INVENTION

It is an object of this invention to produce mononuclear oil-containing microcapsules which are capable of being coated at higher speeds and which dry in a shorter period of time.

The above objects may be accomplished by forming a film of polyvalent electrolyte colloid (the foregoing second sol) around hydrophobic oil drops by the coacervation method to prepared coacervates, gelling the wall film of the coacervate and adding a shock-preventing agent.

DETAILED DESCRIPTION OF THE INVENTION

In this specification, "hardening pretreatment" means an operation to convert the pH of the system rapidly into alkalinity for the purpose of accelerating the reaction of gelation and the aldehyde hardening agent. "Shock" represents that phenomenon wherein, in carrying out the the hardening pretreatment of a coacervate containing an oily liquid, the viscosity rises rapidly when the pH of the system is near the isoelectric point of gelatin, i.e., when a rapid increase of viscosity results in adhesion or cohesion of microcapsules.

Shock-preventing agents which may be used in this invention are polyelectrolytes having an anionic functional group. As examples of such polyelectrolytes may be mentioned modified cellulose, an anionic starch derivative, an anionic acid polysaccharide, a condensate of naphthalene sulfonic acid and Formalin, a hydroxyethyl cellulose derivative, a copolymer of vinylbenzene sulfonate and a copolymer of sodium acrylate.

As examples of modified cellulose, there may be mentioned polysaccharides having $\beta$-1,4-glucoside bonds of glucose and having anionic functional groups. Part or all of the hydroxyl groups of the cellulose may be etherified or esterified. Illustrative of cellulose ethers are carboxymethyl cellulose, carboxyethyl cellulose and metal salts thereof, and illustrative of cellulose esters are cellulose sulfate, cellulose phosphate and metal salts thereof.

The anionic starch derivative may be one which is composed of a linear polysaccharide amylose formed by only $\alpha$-1,4 bonds of D-glucose, and a branched polysaccharide amylopectin formed by mainly $\alpha$-1,4 bonds of D-glucose and partially side chain branched by $\alpha$-1,6 bonds.

As examples of the above starch derivatives may be mentioned carboxymethyl starch, carboxyethyl starch, starch sulfate, starch phosphate and starch xanthate. These are obtained by etherification or esterification of corn starch, wheat starch, rice starch, potato starch, sweet potato starch or tapioca starch, which may be extracted from either the seeds or the roots of the plants in high yield.

As examples of the anionic acid polysaccharides, there may be mentioned polygalacturonic acid, which is obtained by polycondensating linearly D-galactu- ·onic acid between α-1,4 bonds thereof. The acid polysaccharide contains pectin, pectic acid and pectinic acid. These are basic substances comprising pectin matter in a high plane and have been defined as follows:

pectinic acid—polygalacturonic acid in the colloid form containing some methyl ester groups pectin—water soluble pectinic acid containing methyl ester groups pectic acid—polygalacturonic acid in the colloid form containing no methyl ester groups The separation of these compounds may be conducted, in general, by extraction from acids.

The condensate or napthalene sulfonic acid and Formalin is represented by the following formula:

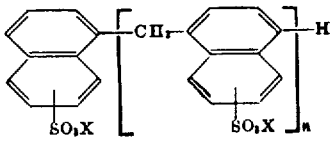

wherein X is a hydrogen atom, an alkali metal or an ammonium group, and n is a positive integer.

Shock-preventing ability of the above condensate is influenced by the degree of polymerization, and it is preferable that n be 5 to 9. In general, the larger the value of n, the more water-solubility and viscosity increases. These compounds are described in Kogyo Kagaku Zashi 66 [1], pp. 55–69 (1963).

As examples of the hydroxyethyl cellulose derivatives, there may be mentioned carboxymethyl ether of hydroxyethyl cellulose, hydroxyethyl cellulose sulfate and hydroxyethyl cellulose phosphate and the like.

As examples of the copolymers of vinylbenzene sulfonate, there may be mentioned vinylbenzene sulfonateacryloylmorpholine copolymer, vinylbenzene sulfonatemorpholinomethylacrylamide copolymer, vinylbenzene sulfonate acrylamide copolymer, vinylbenzene sulfonatevinylpyrrolidone copolymer, and vinylbenzene sulfonatemethoxymethylacrylamide.

These polymers contain the following group in the molecule:

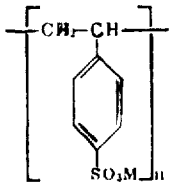

wherein M is an alkali and metal and n is a positive integer. The amount of vinylbenzene sulfonate in the copolymer is preferably 45–95 mol percent, more preferably 60–85 mole percent, and it is preferred, for the purpose of this invention, to use a copolymer having a molecular weight of 10,000–3,000,000, particularly 100,000–1,000,000.

As examples of copolymers of acrylic acid, there may be mentioned acrylic acid-acryloylmorpholine copolymer, acrylic acid-morpholinomethylacrylamide, acrylic acid-acrylamide copolymer, acrylic acid-vinylpyrrolidone copolymer, and acrylic acid-methoxymethylacrylamide.

These polymers contain the following group:

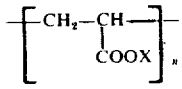

wherein X is a hydrogen atom or an alkali metal, and n is a positive integer.

The amount of acrylic acid in the copolymer is preferably in 40–95 mol percent, especially 50–85 mol percent, and it is preferable, for the purposes of this invention, to use a copolymer having molecular weight of 6,000–2,000,000, especially 50,000–1,000,000.

Preparation of oil-containing microcapsules according to this invention may be carried out by the complex coacervation method induced by water diluting or by pH control. That is, the formation of the complex coacervate from liquid-liquid phase separation is based upon an operation wherein two or more hydrophilic colloid sols are combined and one is separated in a colloid rich phase while the other is maintained in a colloid poor phase. At this time, the coacervated colloid must contain at least two hydrophilic colloids having opposite charges from each other, at least one of the colloids being gelled.

As examples of hydrophilic colloids may be mentioned natural or synthetic high molecular weight compounds such as gelatin, casein, alginate, gum arabic, styrenemaleic anhydride copolymer, polyethylenemaleic anhydride copolymer, and the like.

The nucleus of the individual capsule may comprise natural mineral oils, animal oils, plant oils and the like. Examples of mineral oils include petroleum and its fractions such as kerosene, gasoline, naphtha, paraffin oils and the like. Examples of animal oils include fish oils, lard oils and the like. Examples of plant oils include peanut oil, soybean oil, castor oil, maize oil and the like. Synthetic oils include biphenyl derivatives, phosphoric acid derivatives, naphthalene derivatives, phthalic acid derivatives, salicyclic acid derivatives and the like. When an anionic, cationic or nonionic surface active agent is used so as to emulsify or disperse an oily liquid into a nuclear material in water, it prevents reversing, i.e., the formation of a water-in-oil type emulsion (W/O emulsion). Accordingly, addition of these materials is preferred. An oil-in-water type emulsion can be obtained by emulsifying an oily liquid as the nuclear material in an aqueous colloid solution as the wall material. The emulsion is subjected to water diluting and pH control to accumulate coacervate around the emulsified oil drops. At the same time, the coacervation condition is preferably reduced in order to make mononuclear capsules. Any of the following procedures may be employed to this end:

(1) reducing the amount of water for diluting (2) shifting the controlled value of pH from a value at which the maximum yield of coacervate is given (3) changing the colloid ratio (4) adding an inorganic or organic metal salt In these procedures, a combination of the procedures (1) and (2) is ordinarily sufficient to make a mononuclear capsule. If the controlled value of pH is a value to obtain the maximum yield of coacervate, the amount of water for diluting may be small. If, however, it is shifted from the optimum value, it may be increased.

Since the addition of an inorganic or organic salt ordinarily reduces the yield of coacervate, it is preferred to achieve more stable coacervation conditions than those of (1) and (2).

The coacervate accumulated on the surface of the oil drop after the coacervation step is cooled from the outside to gel the wall film. For example, formaldehyde is added to harden the wall film and the pH of the system is controlled to alkalinity. This treatment for prehardening results in coagulation of the microcapsules under unstable coacervation conditions unless there is a shock-preventing agent. The hardening of the microcapsule wall is further advanced and the heat resistance of the formed capsule is increased by warming. Addition of the shock-preventing agent is carried out at a temperature lower than the setting point of the gelatin wall film, generally below 2° C., preferably below 15° C. The capacity of the shock-preventing agent, depends upon the degree of polymerization of the cellulose and the degree of esterification or etherification. The higher the degree of polymerization, esterification and etherification, the better are the results in that the capacity of the shock-preventing agent is increased. However, in view of solubility and viscosity considerations, the degree of polymerization is preferably 50–500 and the degree of esterification or etherification is preferably 0.5–1.2. The shock-preventing agent may be present in an amount of about 1/12 to one-half the amount (by weight) of the two or more hydrophilic colloids having different charges.

The shock-preventing agent may simplify the hardening pretreatment of microcapsules under insufficient coacervation conditions to give a high concentration capsule liquid. Employing encapsulization by a combination of water dilution and pH control, as disclosed in U.S. Pat. No. 2,800,457, the amount of water is 20.5 g. per 1 g. of the two or more colloids having different charges at a pH of 4.5. If the amount of water is reduced in that method, the capsules will be coagulated during the hardening pretreatment. However, by adding the shock-preventing liquid after the gelling operation, it is possible to reduce the amount of water to 15 g.

When using the microcapsules obtained by the method of this invention for a pressure-sensitive copying paper, many advantages are obtained over the known, polynuclear microcapsules. For example, processing stain when the coated paper is superimposed on a clay surface is minimized, i.e., the pressure strength of the capsule is improved; copying sharpness, i.e., the resolving power of letters in copying a number of sheets is improved; the required air pressure in air knife coating is reduced; and classification of capsules by the air pressure and the coating properties of the liquid are improved.

The following examples are given in order to illustrate in detail the invention without limiting the same, in which all references to proportions are by weight.

The copolymer composition and the intrinsic viscosity of potassium polyvinylbenzene sulfonate and polyacrylic acid used in the examples are as in Tables 1 and 2. These copolymers can easily be produced by aqueous solution polymerization in a water-alcohol mixture in the presence of potassium persulfate, hydrogen peroxide or benzoyl peroxide as the initiator.

TABLE 1

PROPERTIES OF COPOLYMERS

| Copolymer | Copolymer No. | Potassium[1] (mol percent) | Intrinsic viscosity[2] (lg/100 ml.) |
|---|---|---|---|
| Potassium polyvinyl benzenesulfonate-acryloyl morpholine copolymer | 1 | 53.7 | 0.620 |
| | 2 | 63.9 | 0.740 |
| | 3 | 76.5 | 0.421 |

TABLE 1-continued

PROPERTIES OF COPOLYMERS

| Copolymer | Copolymer No. | Potassium[1] (mol percent) | Intrinsic viscosity[2] (lg/100 ml.) |
|---|---|---|---|
| Potassium polyvinylbenzene sulfonate-acrylamide copolymer | 4 | 52.8 | 0.98 |
| | 5 | 66.2 | 0.87 |
| | 6 | 87.0 | 0.71 |
| Potassium polyvinyl benzenesulfonate-vinyl pyrrolidone copolymer | 7 | 67.3 | 0.6 |
| Potassium polyvinylbenzene-sulfonate morpholinomethyl acrylamide copolymer | 8 | 62.1 | 0.530 |
| Potassium polyvinylbenzene-sulfonatemethoxy methylacryl amide copolymer | 9 | 58.5 | 0.412 |

[1]Vinylbenzene sulfonate in the copolymer.
[2]Intrinsic viscosity in 1 N $NaNO_3$ solution at 30° C.

TABLE 2

PROPERTIES OF COPOLYMERS

| Copolymer | Copolymer No. | Sodium acrylate in copolymer (mol percent) | Intrinsic[1] viscosity (1 g./100 ml.) |
|---|---|---|---|
| Sodium polyacrylate acryloyl-morpholine copolymer | 1 | 50.6 | 0.710 |
| | 2 | 58.2 | 0.662 |
| | 3 | 69.5 | 0.463 |
| Sodium polyacrylate acrylamide copolymer | 4 | 63.1 | 0.826 |
| | 5 | 75.5 | 0.641 |
| | 6 | 82.6 | 0.385 |
| Sodium polyacrylate vinyl pyrrolidone copolymer | 7 | 51.6 | 0.583 |
| Sodium polyacrylate morpholino methylacryl amide copolymer | 8 | 63.5 | 0.641 |
| Sodium polyacrylate methoxy-methylacrylamide copolymer | 9 | 68.5 | 0.685 |

[1]Intrinsic viscosity in 1 N $NaNO_3$ solution at 30° C.

In the following examples, the heat resistance was tested by examining the results of pressure writing in the coloring of a clay surface being provided by dissolving crystal violet lactone in an oily liquid in a proportion of 2%, coating the resulting capsules onto a stencil paper and then subjecting them to a heat resistance test in a hot air drying box.

EXAMPLE I

Six parts of an acid-treated gelatin having an isoelectric point of 7.8 and 6 parts of gum arabic were dissolved in 30 parts of water at 40° C. 0.5 part of Turkey red oil was added thereto as an emulsifier. 30 parts of dichlorodiphenyl in which 2.0% of crystal violet lactone (hereinafter referred to as "CVL") had been dissolved was added to the colloidal solution with strong agitation to form an O/W emulsion, and the stirring was stopped when the oil drop size reached 6–10 microns. 190 parts of warm water at 45° C. was added thereto. While further stirring, 50% acetic acid was added in drops to adjust the pH to 4.5. After maintaining this temperature for 15 minutes with agitation, the emulsion was cooled from the outside to gel and fix the accumulated colloid walls. 3.0 parts of 37% formaldehyde solution was added while stirring at a liquid temperature of 15° C. At a liquid temperature of 10° C., dropping of 10% caustic soda solution was started. The viscosity of the capsule solution was 35 cps., measured at 10° C. by means of a B-type rotary viscosimeter (No.

rotor, 30 r.p.m.) (hereinafter referred to as "$B_1$ 30 .p.m."). The pH of the capsule solution was adjusted ɔ 6.5 in 15 minutes. The viscosity measured during the ame time was 125 cps. ($B_1$ 30 r.p.m.). The pH was djusted to 7.0 in another 10 minutes, the viscosity eing 850 cps. Alkali was further added in drops. The apsule solution was aggregated at a pH of 7.3. The izes thereof were uncertain, a large size being in a ange of 5–10 mm.

In this example, the addition of alkali and Formalin in ıe hardening pretreatment was carried out further by wo methods (1) adjusting the pH of the capsule solu- on to an alkalinity of pH 9.5 and then dropping for- ıaldehyde therein; and (2) simultaneously dropping lkali and formaldehyde from two nozzles. In both ases, the capsules were aggregated.

EXAMPLE II

In the wall film gelling step of making microcapsules ccording to Example I, 3.0 parts of 37% formaldehyde vas added at 15° C. and, when the liquid temperature vas 10° C., 25 parts of 5% aqueous solution of carboxy- ıethyl cellulose sold commercially as a sodium salt degree of etherification 0.75, average degree of poly- ıerization 150, hereinafter referred to as "CMC") was dded. The viscosity of the liquid was 30 cps. ($B_1$ 30 .p.m.) after two minutes from the addition. 10% caus- ic soda solution was added in drops thereto to adjust he pH of the capsule solution to 6.5 for 15 minutes. 'he viscosity was 52 cps. ($B_1$ 30 r.p.m.). Further, the iscosity was measured while continuing the addition in lrops of alkali to give 65 cps. at pH 7.0, 88 cps. at pH '.5, 80 cps. at pH 8.0 and 40 cps. at pH 10.0. The time ıver the addition from pH 6.5 to pH 10.0 was 7 min- ıtes. Although there was found some rising of the vis- osity, the capsules were not aggregated. The liquid emperature was raised to 50° C. for 20 minutes while tirring the solution to thus obtain a capsule solution vith excellent heat resistance. It was found by means of microscope that 98% or more of the capsule solution onsisted of mononuclear capsules each consisting of ın emulsified oil drop, although some capsules con- isted of two or more oil drops. The capsule solution vas coated onto a thick paper and then subjected to a ıeat resistance test for 3 hours in a drying box at 150° C. When the resulting capsule paper was combined vith a clay surface and subjected to copying by a ball ɔen, a sharp, colored mark resulted on the clay surface.

EXAMPLE III

In the hardening pretreatment of Example II, after ıdding 25 parts of 5% aqueous solution of CMC, 10% ılkali solution was added to adjust the pH of the cap- ıule solution to 10.0 and 3.0 parts of 37% formalde- ıyde solution was added in drops. The viscosity was 43 cps. ($B_2$ 30 r.p.m.). When 0.8 part of the formaldehyde vas added, the viscosity began to rise and, when the ımount added reached 1.0 part, it was 135 cps. No rise ɔf viscosity was noted thereafter. When the addition of ıll the formaldehyde was finished, the viscosity was 118 cps. The time required for the addition in drops of the 'ormaldehyde was 15 minutes. The solution was varmed to 50° C. for 20 minutes to harden the capsule vall. The thus formed capsules were substantially mon- ɔnuclear capsules possessing such heat resistance that here was found to be no breaking-down of the capsule even in a heat resistance test at 150° C. for 3 hours.

EXAMPLE IV

In the hardening pretreatment of Example II, after adding 25 parts of a 5% aqueous solution of CMC, 37% formaldehyde solution and 10% aqueous alkali solution were simultaneously added at a same dropping speed from two nozzles. The viscosity at a pH of 6.5 was 45 cps. ($B_2$ 30 r.p.m., dropping time 10 minutes). Further continuing the dropping, the viscosity was 67 cps. at a pH of 7.5 and 35 cps. at a pH of 10.0. The solution was warmed to 50° C. in 20 minutes to harden the capsule wall. 99% or more of the thus formed capsules were mononuclear capsules. A heat resistance test at 150° C. for 3 hours gave a sharp color mark with no breaks.

EXAMPLE V

The same procedure was repeated as in Example IV, except that a 10% aqueous sulfonic acid was used in place of the 10% aqueous solution of acetic acid, the pH was adjusted to 4.1, and 25 parts of 5% aqueous solution of CMC was converted into 30 parts thereof. The viscosity was 75 cps. at a pH of 7.5. The thus hardened capsules were mononuclear and had no abnormal characteristics.

EXAMPLE VI 30 parts of a mixed oil consisting of chloroparaffin (Trademark: Toyoparax A–40, chlorine content 40%, manufactured by Toyo Soda Industry Co., Ltd.) and kerosene (4:1), in which 2% of CVL was dissolved, was added to a colloid consisting of 0.5 part of methyl cellulose, 4 parts of gum arabic and 25 parts of warm water to prepare an O/W emulsion. Stirring was stopped when the oil drop size was at most 10 microns. The resulting emulsion was added to an aqueous solution of gelatin consisting of 6 parts of an acid-treated gelatin having an isoelectric point of 7.8 and 170 parts of warm water at 45° C. A 5.0% aqueous solution of succinic acid was added while stirring thereto adjust the pH to 4.2. The emulsion was cooled from the outside of a vessel while stirring gradually to gel and fix the coacervate wall film. At 10° C., 3.0 parts of 30% glutaraldehyde and then 30 parts of 5% aqueous solution of CMC (degree of etherification 0.6, degree of polymerization 240) were added. The viscosity of the capsule dispersion was then 55 cps. ($B_2$ r.p.m.). When 20% aqueous caustic soda solution was added in drops for 10 minutes to adjust the pH of the system to 10.0, the viscosity was 125 cps. ($B_2$ 30 r.p.m.) at a pH of 7.5. The capsule solution was warmed to 50° C. to obtain a hardened capsule.

EXAMPLE VII

The same procedure was repeated as in Example II except that 185 parts of water for dilution was used, the pH was adjusted to 4.0 and 35 parts of 4% aqueous solution of carboxyethyl cellulose (degree of etherification 0.9, degree of polymerization 150) was used as a shock-preventing solution. In the hardening pretreatment, the viscosity of the solution was 95 cps. at a pH of 7.5. The thus obtained capsules were mononuclear.

EXAMPLE VIII

The same procedure was repeated as in Example VI except that the flowing paraffin was substituted with dioctyl phthalate, 170 parts of the gelation solution was increased to 190 parts and 5.0% aqueous solution of succinic acid was substituted with 10% aqueous solution of hydrochloric acid. The system was cooled from the outside of a vessel to solidify the dioctyl phthalate-enclosed coacervate wall. At 15° C., 2.5 parts of 30% glyoxal was poured therein, and at 10° C., 30 parts of 5% aqueous solution of cellulose sulfate (degree of esterification 1.5, degree of polymerization 300) was added thereto. A 20% aqueous solution of caustic soda was added in drops for 15 minutes to adjust the pH of the system to 10.0. The viscosity was 133 cps. ($B_2$ 30 r.p.m.) at a pH of 7.5. The solution was warmed to 50° C. to increase the heat resistance of the capsule. The resulting capsules were mononuclear and possessed a heat resistance of 5 hours at 130° C.

EXAMPLE IX 6 parts of an acid-treated gelatin having an isoelectric point of 7.8 and 6 parts of gum arabic were dissolved in 35 parts of water at 45° C. To the resulting solution were added 0.3 part of sodium alkylbenzenesulfonate as an emulsifier and then 35 parts of dichlorodiphenyl in which 2.0% of CVL had been dissolved to thus prepare an O/W emulsion. The oil drop size was in a range of 8–12 microns. To 200 parts of an aqueous solution containing 0.08% of sodium sulfate at 45° C. were added while stirring the foregoing emulsion, and 70% aqueous solution of acetic acid to adjust the pH to 4.3. The system was cooled from the outside of a vessel to a liquid temperature of 8° C. Then, 3.0 parts of 37% formaldehyde and 25 parts of 7% aqueous solution of CMC (degree of etherification 0.95, degree of polymerization 250) were added. A 10% aqueous solution of caustic soda was added in 15 minutes to adjust the pH to 10.0. The viscosity at a pH of 7.5 was 110 cps. ($B_2$ 30 r.p.m.). The solution was warmed to 50° C. The resulting capsules, 99% or more of which were mononuclear, had a heat resistance of 5 hours at 150° C.

EXAMPLE X

In the wall film gelling step in making microcapsules according to Example I, 3.0 parts of 37% formaldehyde was added at 15° C. and, when the liquid temperature was 10° C., 25 parts of 15% aqueous solution of carboxymethyl starch sold commercially as a sodium salt (degree of etherification 0.3, viscosity 30 cps. at 20° C., hereinafter referred to as "CMS") was added. The viscosity of the liquid was 30 cps. ($B_1$ 30 r.p.m.) after 2 minutes from the addition. 10% caustic soda solution was added in drops thereto to adjust the pH of the microcapsule solution to 6.5 over a period of 15 minutes. The viscosity was 58 cps. ($B_1$ 30 r.p.m.). Further, the viscosity was measured while continuing the addition in drops of alkali to give 81 cps. at pH 7.0, 95 cps. at pH 8.0 and 28 cps. at pH 10.0. The time over the addition from pH 6.5 to pH 10.0 was 10 minutes. Although there was found some rising of the viscosity, the microcapsules were not aggregated. The liquid temperature was raised up to 50° C., over a period of 20 minutes while stirring the solution to thus obtain a microcapsule solution excellent in heat resistance. It was found by means of a microscope that 95% or more of the microcapsule solution consisted of mononuclear capsules each consisting of an emulsified oil drop, although some microcapsules consisted of two or more oil drops. The microcapsule solution was coated onto a thick paper and then subjected to a heat resistance test for 3 hours in a drying box at 150° C. When the resulting microcapsule paper was combined with a clay surface and subjected to copying by a ball pen, a sharp, colored mark resulted on the clay surface.

EXAMPLE XI

In the hardening pretreatment of Example X, after adjusting the pH of the microcapsule solution, 37% aqueous solution of formaldehyde was added to the solution. Namely, in the gelling step, 10 parts of 15% CMS (a raw material; corn starch, degree of etherification 0.3, viscosity at 25° C.: 80 cps. ($B_1$ 30 r.p.m.)) solution, when the liquid temperature was 10° C. The viscosity of the liquid was 38 cps. ($B_1$ 30 r.p.m.) after 2 minutes from the addition. 10% alkali solution was then added to adjust the pH of the microcapsule solution to 10.0. The viscosity of the solution was then 42 cps. ($B_1$ 30 r.p.m.). Thereafter, 37% formaldehyde solution was added. After 0.8 part of the formaldehyde was added, the viscosity was 135 cps. Further addition of the formaldehyde followed, whereby there was found to be no rise in the viscosity thereafter. The time required for the addition in drops of all the formaldehyde was 15 minutes. The thus formed microcapsules were substantially mononuclear capsules possessing such a heat resistance that there was found to be no breaking down of the capsule even in a heat resistance test at 150° C. for 3 hours.

EXAMPLE XII

In the hardening pretreatment of Example X, after adding 25 parts of 5% aqueous solution of CMS, 37% formaldehyde solution and 10% aqueous alkali solution were simultaneously added at a same dropping speed from two nozzles. The viscosity at a pH of 6.5 was 46 cps. ($B_1$ 30 r.p.m., dropping time 8 minutes). Further continuing the dropping, the viscosity was 78 cps. ($B_1$ 30 r.p.m., dropping time 15 minutes) at a pH of 7.5 and 35 cps. ($B_1$ 30 r.p.m.) at a pH of 10.0. The solution was warmed to 50° C. over a period of 20 minutes to harden the microcapsule wall. 95% or more of the thus formed capsules were mononuclear microcapsules. A heat resistance test at 150° C. for 3 hours gave a sharp color mark without breaks.

EXAMPLE XIII

The same procedure was repeated as in Example XII except that a 10% aqueous solution of acetic acid was used instead of the 10% aqueous solution of acetic acid, the pH was adjusted to 4.2 and 12 parts of 15% aqueous solution CMS were employed instead of 10 parts thereof. The viscosity was 70 cps. at a pH of 7.5. The thus hardened capsules were mononuclear and had no abnormal characteristics.

EXAMPLE XIV 30 parts of dioctylphthalate in which 1% crystal violet lactone was dissolved was added to a colloid sol consisting of 0.1 part of methyl cellulose, 4 parts of gum arabic and 25 parts of warm water to prepare an O/W emulsion. The obtained emulsion was added to an aqueous solution of gelatin consisting of 6 parts of an acid-treated gelatin having an isoelectric point of 7.6 and 175 parts of warm water heated to 45° C. 15 parts of 10% aqueous solution of sulfuric acid was added to adjust the pH to 4.05 with stirring. The emulsion was cooled from the outside of the vessel while gradually stirring to gel and fix the coacervate wall film. At 10° C., 1.0 part of 50% gluataraldehyde and then 10% CMS aqueous solution (degree of etherification 0.75, viscosty at 20° C.: 48 cps. ($B_1$ 30 r.p.m.)) was added. The viscosity of the microcapsule dispersion was then 65 cps. ($B_1$ 30 r.p.m.). When 20% aqueous caustic soda solution was added in drops over a period of 10 minutes to adjust the pH of the system to 10.0, the viscosity became 135 cps. ($B_1$ 30 r.p.m.) at a pH of 7.5. The microcapsule solution was warmed to 50° C. to obtain hardened microcapsules.

EXAMPLE XV

The same procedure was repeated as in Example X except that 180 parts of water for dilution was used, the pH was adjusted to 4.0 and 35 parts of 4% aqueous solution of carboxyethyl starch (degree of etherification 0.65, viscosity at 20° C.: 55 cs.) was used as a shock preventing solution. In the hardening pretreatment, the viscosity of the solution was 113 cps. at a pH of 7.5. The thus obtained microcapsules were mononuclear.

EXAMPLE XVI

The same procedure was repeated as in Example XIV except that the dioctylphthalate was substituted with a mixed oil consisting of chlorinated paraffin (chlorine content 40%) and kerosene (2:1) and 10% aqueous solution of CMS was substituted with 10% aqueous solution of starch sulfate (degree of etherification 0.45, viscosity of 20° C.: 210 cps. ($B_2$ 30 r.p.m.). The viscosity was 178 cps. ($B_2$ 30 r.p.m.) at a pH of 7.5. The resulting capsules were mononuclear, having a heat resistance of 3 hours at 130° C.

EXAMPLE XVII 6 parts of an acid-treated gelatin having an isoelectric point of 7.8 and 6 parts of gum arabic were dissolved in 30 parts of water at 40° C., and then into the solution, 0.3 part of sodium alkylbenzene sulfonate was added. To the resulting solution, 35 parts of a mixed oil consisting of chlorinated paraffin (Trademark: Toyoparax A-40, chlorine content 40%, manufactured by Toyo Soda Industry Co., Ltd.) and kerosene (3:1) in which 2% of CVL was dissolved was added to prepare an O/W emulsion having oil drop sizes of 10–12 microns.

The resulting solution was added to 190 parts of 0.05% aqueous solution of sodium sulfate at 45° C. and the 70% aqueous solution of acetic acid was added in drops with stirring to adjust the pH of the system to 4.2.

The emulsion was cooled to 5° C. from the outside of a vessel while gradually stirring to gel and fix the coacervate wall film. At 10° C., 3.0 parts of 37% formaldehyde and then 10 parts of 15% aqueous solution of CMS (degree of etherification 0.73, viscosity at 20° C.: 250 cps. ($B_2$ 30 r.p.m.)) were added. When 10% aqueous caustic soda solution was added in drops over a period of 15 minutes to adjust the pH of the system to 10.2, the viscosity was 125 cps. ($B_2$ 30 r.p.m.) at a pH of 7.5. The microcapsule solution was warmed to 50° C. to obtain hardened microcapsules, more than 99% of which were mononuclear, having a heat resistance of 3 hours at 150° C., and providing a sharp color mark without breaks.

EXAMPLE XIX

In the wall film gelling step of making microcapsules according to Example I, 3.0 parts of 37% formaldehyde was added at 15° C. and, when the liquid temperature was 10° C., 20 parts of 7.5% aqueous solution of pectin made from applies (sold commercially by Wako Junyaku Ind. Co.), was added. The viscosity of the liquid was 30 cps. ($B_1$ 30 r.p.m.) after 2 minutes from the addition. 10% caustic soda solution was added in drops thereto to adjust the pH of the microcapsule solution to 6.5 for 10 minutes. The viscosity was 62 cps. ($B_1$ 30 r.p.m.). The viscosity was further measured while continuing the dropwise addition of alkali to give 85 cps. at pH 7.0, 112 cps. at pH 8.0 and 31 cps. at pH 10.0. The time of addition from pH 6.5 to pH 10.0 was 10 minutes. Although there was found some rising of the viscosity, the capsules were not aggregated. The liquid temperature was raised to 50° C. over a period of 20 minutes while stirring the solution to thus obtain a capsule solution excellent in heat resistance. It was found by means of a microscope that 97% or more of the microcapsule solution consisted of mononuclear microcapsules each being of an emulsified oil drop. The microcapsule solution was coated onto a thick paper and then subjected to a heat resistance test for 3 hours in a drying box at 150° C. When the resulting microcapsule paper was combined with a clay surface and subjected to copying by a ball pen, a sharp, colored mark was produced on the clay surface. The microcapsules were found to have excellent heat resistance.

EXAMPLE XX

The same procedure was repeated as in Example XIX, except that 37% formaldehyde solution was added after converting the pH of the microcapsule solution in the hardening pretreatment. Namely, when the temperature of the solution was 10° C. in the gelling step, 20 parts of 7.5% aqueous solution of pectin made from lemons was added. Thereafter, 10% aqueous solution of sodium hydroxide was added to adjust the pH of the system to 10.1. The viscosity of the system was then 48 cps. ($B_1$ 30 r.p.m.). 37% formaldehyde solution was then added in drops. When 0.8 part of the formaldehyde had been added, the viscosity was 145 cps. ($B_1$ 30 r.p.m.). Further, the addition of formaldehyde solution was continued until the amount added was 3.0 parts. There was found to be no rising of the viscosity thereafter.

The time required for the addition in drops of all the formaldehyde was 15 minutes. The thus-obtained microcapsules were more than 95% mononuclear. After the microcapsule solution was coated on a paper, a heat resistance test carried out for 3 hours at 150° C., whereby it was proved that the microcapsules had excellent heat resistance.

EXAMPLE XXI

The same procedure was repeated as in Example XIX except that 20 parts of 10% aqueous solution of pectic acid was used instead of pectin aqueous solution. The viscosity was 80 cps. ($B_1$ 30 r.p.m.) at pH 7.0 and 130 cps. ($B_1$ 30 r.p.m.) at pH 8.0. The hardened microcapsules were mononuclear, having heat resistance for 3 hours at 150° C.

EXAMPLE XXII

The same procedure was repeated as in Example XIX except that 35 parts of 5% aqueous solution of pectinic acid was used instead of pectin aqueous solution. The viscosity was 92 cps. ($B_1$ 30 r.p.m.) at pH 7.0 and 115 cps. ($B_1$ 30 r.p.m.) at pH 8.0. The hardened microcapsules were mononuclear having heat resistance of 3 hours at 150° C.

EXAMPLE XXIII 10 parts of an acid-treated gelatin having an isoelectric point of 8.2 and 10 parts of gum arabic were dissolved in 50 parts of water at 40° C. Into the solution, 0.2 part of Turkey red oil was added as an emulsifier. 50 parts of dichlorodiphenyl was added to the collidal solution with vigorous agitation to form an O/W emulsion and the stirring was stopped when the oil drop size reached 6–10 microns. 320 parts of warm water at 40° C. was added thereto. While further stirring, 50% acetic acid was added in drops to adjust the pH to 4.4. The emulsion was cooled at a rate of 1° C./min. to 8° C. from the outside to gel and fix the accumulated colloid walls. 3.0 parts of 37% formaldehyde solution was added while stirring at a liquid temperature of 15° C. The viscosity of the capsule solution was 38 cps. at 8° C. The pH of the microcapsule solution was then adjusted to 6.5 over a period of 15 minutes. The viscosity measured during the same time was 185 cps. ($B_1$ 30 r.p.m.). Alkali was further added in drops. The capsule solution was aggregated at a pH of 6.8. The size thereof was uncertain, a large size being in a range of 5–10 mm.

This example was repeated, except that the addition of alkali and formalin in the hardening pretreatment was carried out by two methods: (1) adjusting the pH of the capsule solution to alkalinity (pH 9.5) and then dropping formaldehyde therein; and (2) dropping simultaneously alkali and formaldehyde from two nozzles. In both cases, the capsules were aggregated.

EXAMPLE XXIV

In the wall film gelling step in making microcapsules according to Example XXIII, 3.0 parts of 37% formaldehyde was added at 15° C., and when the liquid temperature was 10° C., 20 parts of 20% aqueous solution of sodium salt of naphthalene sulfonic acid-Formalin condensate was added. The viscosity of the liquid was 28 cps. ($B_1$ 60 r.p.m.) after 2 minutes from the addition. 10% caustic soda solution was added in drops thereto to adjust the pH of the microcapsule solution to 6.5 for 15 minutes. The viscosity was 74 cps. The viscosity was further measured while continuing the addition in drops of alkali to give 250 cps. at pH 7.0 ($B_2$ 30 r.p.m.), 435 cps. at pH 7.5 ($B_2$ 30 r.p.m.), 415 cps. at pH 8.0 ($B_2$ 30 r.p.m.) and 185 cps. at pH 10.0 ($B_2$ 30 r.p.m.). The liquid temperature was raised to 50° C. for 20 minutes while stirring the solution to thus obtain a microcapsule solution excellent in heat resistance, said microcapsules being mononuclear. An increase of the viscosity is also influenced by the dropping speed of the alkali when converting the pH of the system from acid to alkali, and therefore the viscosity in the pH-changing step is increased with an increase in the dropping speed.

EXAMPLE XXV 10 parts of an acid-treated gelatin having an isoelectric point of 7.9 and 10 parts of gum arabic were dissolved in 50 parts of water at 40° C. To the solution, oil having 0.3 part of sodium alkylbenzene sulfonate was added thereto as an emulsifier. 60 parts of chlorinated paraffin having chlorination degree of 40% and molecular weight of 1,000 was added to the colloidal solution to form an O/W emulsion. The average oil drop size reached 6 microns. 290 parts of 0.05% aqueous solution of sodium chloride at 45° C. was added thereto. While further stirring, 10% sulfuric acid was added in drops to adjust the pH to 4.3. The emulsion was cooled to 8° C. from the outside to gel and fix the accumulated colloid walls. 3.5 parts of 37% formaldehyde solution was added, after which was added 25 parts of 20% aqueous solution of sodium salt of naphthalene sulfonic acid-Formalin condensate. The pH of the capsule solution was adjusted to 6.5 over a period of 15 minutes. Dropping of 10% caustic soda solution was then started. The viscosity of the microcapsule solution was 68 cps. ($B_1$ 60 r.p.m.). The pH was adjusted to 8.0 after another 15 minutes, the viscosity being 440 cps. ($B_2$ 30 r.p.m.). Alkali was further added in drops until the pH was 10.0. Thereafter, the liquid temperature was elevated to 50° C. to harden the wall of the microcapsules, which were mononuclear microcapsules containing chlorinated paraffin and having excellent heat resistance.

EXAMPLE XXVI 10 parts of an acid-treated gelatin having an isoelectric point of 7.9, 10 parts of gum arabic and 0.2 part of Turkey red oil were dissolved in 50 parts of water at 40° C. To the solution, 50 parts of chlorinated diphenyl and 10 parts of liquid paraffin having low molecular weight were added to prepare an O/W emulsion. The oil drop size was in a range of 8–12 microns. The emulsion was added to 200 parts of a 0.4% aqueous solution of styrenemaleic acid copolymer while stirring. Thereafter, a 10% aqueous solution of sulfuric acid was added to adjust the pH to 4.8. The system was cooled from the outside of a vessel to a liquid temperature of 8° C. 3.5 parts of 37% formaldehyde and then 22 parts of a 20% aqueous solution of sodium salt of naphthalene sulfonic acid-Formalin condensate were added. After 5 minutes, a 10% aqueous solution of sodium carbonate the was added over a period of 10 minutes to adjust the pH to 6.5. The viscosity at that time was 46 cps. The pH was adjusted to 8.0 for another 10 minutes. The viscosity at a pH of 8.0 was 218 cps. ($B_2$ 30 r.p.m.). The dropping of alkali was continued until the pH was 9.0. The solution was warmed to 50° C. The resulting microcapsules contained diphenyl chloride and liquid paraffin and had excellent heat resistance.

EXAMPLE XXVII

In the wall film gelling step of making microcapsules according to Example XXIII, 50 parts of 37% formaldehyde was added at 15° C. and, when the liquid temperature was 8° C., 50 parts of a 5% aqueous solution of carboxymethyl hydroxyethyl cellulose (degree of substitution 0.63, viscosity of 2% aqueous solution at 25° C.: 342 cps. ($B_2$ 60 r.p.m.)) was added. After 2 minutes from the addition, a 10% caustic soda solution was added in drops thereto to adjust the pH of the microcapsule solution to 6.5 for 15 minutes. The viscosity was 48 cps. ($B_1$ 60 r.p.m.). Further, the viscosity was measured while continuing in addition in drops of alkali to give 76 cps. ($B_1$ 60 r.p.m.) at pH 7.0, 92 cps. ($B_1$ 60 r.p.m.) at pH 8.0 and 42 cps. ($B_1$ 60 r.p.m.) at pH 10.0. The liquid temperature was raised to 50° C. for 20 minutes while stirring the solution to thus obtain a microcapsule solution excellent in heat resistance, said microcapsules being mononuclear and containing chlorinated diphenyl.

EXAMPLE XXVIII

The same procedure used in Example XXVII was repeated, except that 40 parts of a 5% aqueous solution sodium salt of carboxymethylhydroxyethyl cellu-
ıe (degree of substitution 0.72 viscosity of 2%
ueous solution 120 cps. ($B_2$60 r.p.m.)) were used.
ıe viscosity was 42 cps. at a pH of 6.5 and 82 cps.
a pH of 8.0. The thus hardened microcapsules
ere mononuclear and had no abnormal char-
teristics.

When the addition of a 37% formaldehyde aqueous
lution was carried out after converting the pH to
cali in Examples XXVII and XXVIII, the viscosity
the system was slightly increased in comparison
th the above procedure. However, mononuclear
icrocapsules were obtained without aggregation.

EXAMPLE XXIX 10 parts of an acid-treated gelatin having an isoelec-
c point of 7.9 and 10 parts of gum arabic were dis-
lved in 50 parts of water at 40° C. To the resulting
lution was added 0.3 part of sodium alkylbenzene-
lfonate as an emulsifier, and then 60 parts of chlori-
ted paraffin (chlorination degree 40%, molecular
eight 1,000) to prepare an O/W emulsion. The oil
op size was in a range of 6–10 microns. To 275 parts
an aqueous solution containing 0.1% of sodium
loride at 45° C. were added, while stirring, the fore-
ing emulsion and a 10% aqueous solution of sulfuric
id to adjust the pH to 4.3. The system was cooled
om the outside of the vessel to a liquid temperature
8° C. Thereafter, 3.0 parts of 37% formaldehyde
d 50 parts of a 5% aqueous solution of sodium salt
carboxymethylhydroxyethyl cellulose (degree of
bstitution 0.86 viscosity of 2% aqueous solution at
° C., 120 cps. ($B_2$ 60 r.p.m.)) were added. A 10%
ueous solution of caustic soda was added. The
scosity at a pH of 8.0 was 165 cps. ($B_2$ 60 r.p.m.).
ıe dropping of alkali was continued until the pH was
).5 and then the solution was warmed to 50° C.,
hereby mononuclear microcapsules having excellent
at resistance and containing chlorinated paraffin
ere obtained.

EXAMPLE XXX

The same procedure used in Example XXVII was
peated except that 40 parts of a 5% aqueous solution
sodium salt of sulfated hydroxyethyl cellulose, (de-
ee of substitution 0.52, viscosity of 2% aqueous
lution at 25° C.: 185 cps. ($B_2$ 60 r.p.m.)) were used.
ıe viscosity was 57 cps. ($B_1$ 60 r.p.m.) at a pH of
5 and 120 cps. ($B_1$ 30 r.p.m.) at a pH of 8.0, whereby
ononuclear microcapsules having excellent heat
sistance were obtained.

EXAMPLE XXXI 10 parts of gelatin obtained by acid treatment of
gskin having an isoelectric point of 8.2 and 10
arts of gum arabic were dissolved in 50 parts of
arm water having a temperature of 40° C. To this
olution was added 0.15 part of Turkey red oil as the
emulsifier. 50 parts of chlorinated diphenyl was added to the gelatin-gum arabic colloidal aqueous solution while vigorously stirring to emulsify, thereby forming an O/W emulsion. The stirring was stopped when the oil drop size became 6–10$\mu$. 300 parts of warm water at 40° C. were added to the emulsion, followed by a 50% aqueous solution of acetic acid which was added in drops, while continuing to stir, to adjust the pH to 4.35. The system was cooled to 8° C., while stirring, out of the vessel at a velocity of 1° C./min., and colloid, accumulated to surround the oil drops, was then gelled. When the solution temperature was 10° C., 4 parts of an aqueous solution containing 37% formaldehyde was added, followed by the addition of 40 parts of an aqueous solution containing 10% potassium polyninylbenzenesulfonate-acrylolmorpholine copolymer (copolymer No. 1 in Table I). After 2 minutes, a 10% aqueous solution of caustic soda was added in drops while stirring, and the solution was adjusted to pH 10.5 in 20 minutes. The viscosity of the capsule dispersing solution was increased in accordance with the rise in pH, and the maximum viscosity was between pH 7.5 and 8.0. The viscosity at pH 8.0 was 185 cps. ($B_2$ 30 r.p.m.).

By heating to 50° C. in 20 minutes while continuing stirring, the wall membrane was hardened to obtain chlorinated diphenyl-coated single nucleus microcapsules having good heat resistance of more than 125° C.

Repeating this example, when the pH was exchanged without adding the aqueous solution of potassium polyvinylbenzenesulfonate-acryloylmorpholine copolymer as the shock-preventing agent, the viscosity near pH 6.0 was 175 cps. ($B_1$ 30 r.p.m.) and that near pH 6.8 reached several thousand cps., thereby gelling and coagulating the whole solution. The capsule shape thus obtained was not uniform and the size was 0.5 mm.

EXAMPLE XXXII

The same treatment as in Example XXXI was carried out except that 37 parts of an aqueous solution containing 10% potassium polyvinylbenzenesulfonate-acryloylmorpholine copolymer (copolymer No. 2 in Table I) were used as the shock-preventing agent. When the pH was adjusted to pH 8.0, the viscosity was 160 cps. ($B_1$ 30 r.p.m.). Single nuclear microcapsules having a heat resistance of more than 125° C. were formed.

EXAMPLE XXXIII

The same treatment as in Example XXXI was carried out with the exception that 50% acetic acid was replaced by 10% sulfuric acid, the 300 parts of warm water were replaced by 310 parts thereof, and 35 parts of an aqueous solution containing 10% potassium polyvinylbenzenesulfonate-morpholinoacrylamide (copolymer No. 3 in Table I) was used as the shock-preventing agent. When the pH was adjusted to pH 8.0, the viscosity was 135 cps. ($B_1$ 30 r.p.m.). Chlorinated diphenyl single nucleus microcapsules having a heat resistance of more than 125° C. were formed.

EXAMPLE XXXIV 10 parts of gelatin obtained by acid treatment of cow skin having an isoelectric point of 8.15, 6 parts of gum arabic and 0.2 part of Turkey red oil were dissolved in 50 parts of warm water having a temperature of 40° C. To this solution was added 60 parts of liquid paraffin, Smoil-p 350 (trade name, produced by Muramatsu Sekiyu K.K.) as an emulsifier, thereby forming an O/W emulsion with an average oil drop size of 60$\mu$. The emulsion was poured into 265 parts of an aqueous solution containing 0.1% of styrene-maleic anhydride copolymer while stirring.

A 10% aqueous solution of sulfuric acid was then added in drops to adjust the pH to 4.6, and the system was cooled while continuing stirring thereof so as to bring the solution temperature of the dispersing system to 8° C. Thereafter, the coacervate on the walls of the oil drops was gelled. 30 parts of an aqueous solution containing 37% formaldehyde was added, followed by 35 parts of an aqueous solution containing 10% potassium polyvinylbenzenesulfonate-acrylamide copolymer (copolymer No. 4 in Table I). After 5 minutes, 10% caustic soda was added in drops for 20 minutes to adjust the pH to 10.5. The viscosity of pH 8.0 was 106 cps. ($B_1$ 30 r.p.m.). The solution was heated to 40° C. to obtain liquid paraffin-coated single nucleus microcapsules having a heat resistance of more than 125° C.

EXAMPLE XXXV 10 parts of gelatin obtained by acid treatment of pigskin having an isoelectric point of 7.95 and 10 parts of gum arabic were dissolved in 50 parts of warm water having a temperature of 45° C. The gelatin-gum arabic aqueous solution was mixed with a dispersing solution obtained by dispersing 60 parts of $\gamma$-$Fe_2O_3$ having a particle size of 0.3$\mu$ into a mixture of 0.2 part of Turkey red oil with 300 parts of water by means of a supersonic dispersing apparatus.

Stirring was continued by means of a propeller-type stirrer and 10% hydrochloric acid was added in drops to adjust the pH to 4.4. Thereafter, the system was cooled to solidify the coacervate wall accumulated on the particles of $\gamma$-$Fe_2O_3$. When the solution temperature reached 8° C., 8 parts of an aqueous solution containing 10% glutalaldehyde were added, followed by 30 parts of an aqueous solution containing 10% potassium polyvinylbenzenesulfonate-acrylamide copolymer (copolymer No. 4 in Table I) while stirring over a 5-minute period. Thereafter, 10% NaOH aqueous solution was added, and the pH was adjusted to 10.5 in 20 minutes. The viscosity at pH 8.0 was 175 cps. ($B_1$ 30 r.p.m.). The resulting product was heated to 50° C. to obtain coated $\gamma$-$Fe_2O_3$ microcapsules.

EXAMPLE XXXVI

The same treatment as in Example XXXXI was conducted except that chlorinated diphenyl was replaced by chlorinated paraffin and an aqueous solution containing 10% polyvinyl sulfonic acid-vinylpyrrolidone copolymer (copolymer No. 7 in Table I) was used as the shock-preventing agent. The viscosity at pH 8.0 was 187 cps. ($B_1$ 30 r.p.m.).

EXAMPLE XXXVII

The same treatment as in Exmaple XXXV was conducted except that 35 parts of an aqueous solution containing 10% potassium polyvinylbenzenesulfonate-morpholinomethylacrylamide copolymer (copolymer No. 8 in Table I was used as the shock-preventing agent. The viscosity at pH 8.0 was 165 cps. ($B_2$ 30 r.p.m.).

EXAMPLE XXXVIII

The same treatment as in Example XXXI was conducted except that 25 parts of an aqueous solution containing 10% potassium polyvinylbenzenesulfonate-methoxymethylacrylamide copolymer (copolymer No. 9 in Table 1) was used as the shock-preventing agent. The viscosity at pH 8.0 was 165 cps. ($B_2$ 30 r.p.m.).

EXAMPLE XXXIX 10 parts of gelatin obtained by acid treatment of pigskin having an isoelectric point of 8.2 and 10 parts of gum arabic were dissolved in 50 parts of warm water having a temperature of 40° C.

To this solution was added 0.15 part of Turkey red oil as the emulsifier. 50 parts of chlorinated diphenyl were added to the gelatin-gum arabic colloidal aqueous solution while vigorously stirring to emulsify, thereby forming an O/W emulsion, and stirring was stopped when the oil drop size became 6–10$\mu$. 310 parts of warm water at 40° C. were added to the emulsion, followed by the addition of a 50% aqueous solution of acetic acid in drops, while continuing to stir, to adjust the pH to 4.35. The system was cooled to 8° C., while stirring, at a velocity of 1° C./min., and the colloid, accumulated so as to surround the oil drops, was then gelled. When the solution temperature was 10° C., 4 parts of an aqueous solution containing 37% formaldehyde was added, followed by 38 parts of an aqueous solution containing 10% sodium polyacrylate acryloylmorpholine copolymer (copolymer No. 1 in Table 2). After 2 minutes, a 10% aqueous solution of caustic soda was added in drops while stirring, and the solution was adjusted to pH 10.5 in 20 minutes. The viscosity of the capsule dispersing solution was increased in accordance with the rise in pH, the maximum viscosity occurring between pH 7.5 and 8.0. The viscosity at pH 8.0 was 235 cps. ($B_2$ 30 r.p.m.).

By heating to 50° C. in 20 minutes while continuing stirring, the wall membrane was hardened to obtain coated chlorinated diphenyl single nucleus microcapsules having good heat resistance of more than 125° C.

Repeating this example, when the pH was adjusted without adding the aqueous solution of potassium polyvinylbenzenesulfonate-acryloylmorpholine copolymer as the shock-preventing agent, the viscosity near pH 6.0 was 175 cps. ($B_1$ 30 r.p.m.) and that near pH 6.8 reached several thousands cps., thereby gelling and coagulating the whole solution. The capsule shape thus obtained was not uniform and the size was 0.5 mm.

EXAMPLE XXXX

The same treatment as in Example XXXIX was carried out except that 40 parts of an aqueous solution containing 10% sodium polyacrylate-acryloylmorpholine copolymer (copolymer No. 2 in Table 2) was used as the shock-preventing agent. When the pH was adjusted to pH 8, the viscosity was 198 cps. ($B_1$ 30 r.p.m.). Single nucleus capsules having a heat resistance of more than 125° C. were formed.

EXAMPLE XXXXI

The same treatment as in Example XXXIX was carried out with the exception that 50% acetic acid was eplaced by 10% sulfuric acid, 320 parts of warm water vere used instead of 300 parts thereof, and 32 parts of in aqueous solution containing 10% sodium polyacrylate-morpholinoacrylamide (Compound No. 3 in Table 2) were used as the shock-preventing agent. When the pH was adjusted to pH 8, the viscosity was 148 cps. ($B_1$ 30 r.p.m.). Coated chlorinated diphenyl single nucleus microcapsules having heat resistance of more than 125° C. were formed.

EXAMPLE XXXXII 10 parts of gelatin obtained by acid treatment of cow skin having an isoelectric point of 8.15, 6 parts of gum arabic, and 0.2 part of Turkey red oil were dissolved in 50 parts of warm water having a temperature of 40° C. To this solution was added 60 parts of liquid paraffin as an emulsifier, thereby forming an O/W emulsion with an average oil drop size of 60$\mu$.

The emulsion was poured into 265 parts of an aqueous solution containing 0.1% of styrene-maleic anhydride copolymer while stirring. Thereafter, a 10% aqueous solution of sulfuric acid was added in drops to adjust the pH to 4.6, and the system was cooled while continuing stirring thereof so as to lower the solution temperature of the dispersing system to 8° C. Thereafter, the coacervate walls of the oil drops were gelled. 30 parts of an aqueous solution containing 37% formaldehyde were added, followed by 35 parts of an aqueous solution containing 10% sodium polyacrylate-acrylamide copolymer (copolymer No. 4 in Table 2). After 5 minutes, 10% caustic soda was added in drops in 20 minutes to adjust the pH to 10.5. The viscosity at pH 8.0 was 125 cps. ($B_1$ 30 r.p.m.). The solution was heated to 40° C. to obtain coated liquid paraffin single nucleus microcapsules having a heat resistance of more than 125° C.

EXAMPLE XXXXIII 10 parts of gelatin obtained by acid treatment of pigskin having an isoelectric point of 7.95 and 10 parts of gum arabic were dissolved in 50 parts of warm water having a temperature of 45° C. This gelatin-gum arabic aqueous solution was mixed with a dispersing solution obtained by dispersing 60 parts of $\gamma$-$Fe_2O_3$ having a particle size of 0.3$\mu$ into a mixture of 0.2 part of Turkey red oil with 300 parts of water by means of a supersonic dispersing apparatus.

Stirring was continued by means of a propeller type stirrer and 10% hydrochloric acid was added in drops to adjust the pH to 4.4. Thereafter, the system was cooled to solidify the coacervate wall accumulated on the particles of $\gamma$-$Fe_2O_3$. When the solution temperature became 8° C., 8 parts of an aqueous solution containing 10% glyoxal were added, followed by 35 parts of an aqueous solution containing 10% sodium polyacrylate-acrylamide copolymer (copolymer No. 4 in Table 2) while stirring for 5 minutes. Thereafter, 10% NaOH aqueous solution was added to adjust the pH to 10.5 in 20 minutes. The viscosity at pH 8.0 was 193 cps. ($B_1$ 30 r.p.m.). The resulting product was heated to 50° C. to obtain coated $\gamma$-$Fe_2O_3$ microcapsules.

EXAMPLE XXXXIV

The same treatment as in Example XXXIX was conducted except that chlorinated diphenyl was replaced by chlorinated paraffin and an aqueous solution containing 10% sodium polyacrylate-acrylamide copolymer (copolymer No. 7 in Table 2) was used as the shock-preventing agent. The viscosity at pH 8.0 was 225 cps. ($B_2$ 30 r.p.m.).

EXAMPLE XXXXV

The same treatment as in Example XXXXIII was conducted except that 37 parts of an aqueous solution containing 10% sodium polyacrylate-morpholinomethylacrylamide copolymer (copolymer No. 8 in Table 2) was used as the shock-preventing agent. The viscosity at pH 8.0 was 225 cps. ($B_1$ 30 r.p.m.).

EXAMPLE XXXXVI

The same treatment as in Example XXXIX was conducted except that 45 parts of an aqueous solution containing 10% sodium polyacrylate-methoxymethylacrylamide copolymer (copolymer No. 9 in Table 2) was used as the shock-preventing agent. The viscosity at pH 8.0 was 240 cps. ($B_2$ 30 r.p.m.).

What is claimed is:

[1. In a method for producing oil-containing mononuclear microcapsules by emulsifying a water-immiscible oil and an aqueous solution of a hydrophilic colloid to obtain a first sol ionizable in water, by (a) admixing said first sol and an aqueous solution of a hydrophilic colloid to obtain a second sol ionizable in water and having an electric charge opposite to that of the first sol, one of said colloids being gelatin, (b) adding water thereto and/or adjusting the pH thereof to cause coacervation, thus to obtain coacervates wherein the complex colloids are deposited around the individual oil drop, (c) cooling the coacervates to cause gelation thereof, and (d) adding a hardening agent to the system and adjusting the pH to a range of from 7 to 11, the improvement which comprises:

adding an aqueous solution of a polyelectrolyte having anionic functional groups to the dispersion containing said coacervates at a temperature lower than the gelling point of the gelatin, in an amount sufficient to prevent a rise in viscosity thereof, said addition being made after gelation of the coacervates has occurred and before adjustment of the pH and addition of the hardening agent, and said adjusting of said pH occurring before or after the addition of said hardening agent, said polyelectrolyte being a member selected from the group consisting of a modified cellulose comprising polysaccharides having beta-1,4-glucoside bonds of glucoses and having anionic functional groups, an anionic starch derivative composed of a linear polysaccharide amylose formed by only alpha-1,4 bonds of D-glucose, and a branched polysaccharide amylopectin formed by mainly alpha-1,4 bonds of D-glucose and a partially side chain branched by alpha-1,6 bonds, an anionic acid polysaccharide, obtained by polycondensating linearly D-galaturonic acid between the alpha-1,4 bonds thereof, said acid polysaccharide containing pectin, pectic acid, and pectinic acid, a condensate of naphthalene sulfonic acid and Formalin, which condensate is presented by the formula:

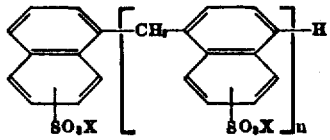

wherein X is a hydrogen atom, an alkali metal, or an ammonium group, and n is a positive integer, a hydroxyethyl cellulose derivative selected from the group consisting of the carboxymethyl ether of hydroxyethyl cellulose, hydroxyethyl cellulose sulfate, and hydroxyethyl cellulose phosphate, a vinyl-benzene sulfonate copolymer selected from the group consisting of a vinylbenzene sulfonate-acryloylmorpholine copolymer, a vinylbenzene sulfonate-morpholinomethylacrylamide copolymer, a vinylbenzene sulfonate acrylamide copolymer, a vinylbenzene sulfonate-vinylpyrrolidone copolymer, and a vinylbenzene sulfonate-methyloxymethylacrylamide, said copolymer having the following group within its molecular structure:

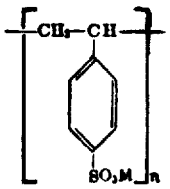

wherein M is an alkali metal and n is a positive integer, and an acrylic acid copolymer selected from the group consisting of an acrylic acid-acryloylmorpholine copolymer, an acrylic acid-morpholinomethylacrylamide copolymer, an acrylic acid-acrylamide copolymer, an acrylic acid-vinylpyrrolidone copolymer, and an acrylic acid-methoxymethylacrylamide copolymer, said copolymer having the following group within its molecular structure:

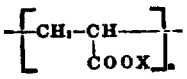

wherein X is a hydrogen atom or an alkali metal, and n is a positive integer. ]

2. The method of claim [1] *32* wherein the amount of said polyelectrolyte is from 1/12 to ½ by weight based on the total amount of hydrophilic colloids present.

3. The method of claim [1] *32* wherein said modified cellulose is selected from the group consisting of carboxymethyl cellulose, carboxyethyl cellulose, cellulose sulfate, cellulose phosphate and a metal salt thereof.

4. The method of claim [1] *32* wherein in said anionic starch derivative is selected from the group consisting of carboxymethyl starch, carboxyethyl starch, starch sulfate, starch phosphate and starch xanthate.

5. The method of claim [1] *32* wherein said polyelectrolyte is an anionic acid polysaccharide.

6. The method of claim [1] *32* wherein said polyelectrolyte is a hydroxyethyl cellulose derivative.

7. The method of claim [1] *32* wherein said polyelectrolyte is a vinylbenzene sulfonate copolymer.

8. The method of claim [1] *32* wherein said polyelectrolyte is an acrylic acid copolymer.

9. The method of claim [1] *32* wherein said microcapsules contain a colorless leuco dye capable of forming a color dye when contacted with clay.

10. Oil-containing microcapsules produced according to the method of claim [1] *32*.

11. Oil-containing microcapsules produced according to the method of claim 9.

12. The method of claim [1] *32*, wherein said condensate of naphthalene sulfonic acid and Formalin has a degree of polymerization ranging from 5 to 9.

13. The method of claim [1] *32*, wherein said vinyl-benzene sulfonate in said vinyl-benzene sulfonate copolymer is present in an amount of from 45 to 95 mol percent.

14. The method of claim [1] *32*, wherein said vinyl-benzene sulfonate in said vinyl-benzene sulfonate copolymer is present in an amount of from 60 to 85 mol percent.

15. The method of claim [1] *32*, wherein the molecular weight of said vinyl-benzene sulfonate copolymer ranges from 10,000 to 3,000,000.

16. The method of claim [1] *32*, wherein the molecular weight of said vinyl-benzene sulfonate copolymer ranges from 100,000 to 1,000,000.

17. The method of claim [1] *32*, wherein said acrylic acid in said acrylic acid copolymer is present in an amount of from 40 to 95 mol percent.

18. The method of claim [1] *32*, wherein said acrylic acid in said acrylic acid copolymer is present in an amount of from 50 to 85 mol percent.

19. The method of claim [1] *32*, wherein said acrylic acid copolymer has a molecular weight of from 6,000 to 2,000,000.

20. The method of claim [1] *32*, wherein said acrylic acid in said acrylic acid copolymer has a molecular weight of from 50,000 to 1,000,000.

21. The method of claim [1] *32*, wherein said hydrophilic colloid is a member selected from the [roup] *group* consisting of gelatin, casein, alginate, gum arabic, styrene-maleic anhydride copolymers, and polyethylene-maleic anhydride copolymers.

22. The method of claim [1] *32*, wherein the addition of said polyelectrolyte takes place at a temperature of below 20° C.

23. The method of claim [1] *32*, wherein the addition of said polyelectrolyte takes place at a temperature of below 15° C.

24. The method of claim [1] *32*, wherein said pH is 7.0.

25. The method of claim [1] *32*, wherein said pH is 7.5.

26. The method of claim [1] *32*, wherein said pH is 8.0.

27. The method of claim [1] *32*, wherein said pH is 10.0.

28. The method of claim 4, wherein the cellulose of said anionic starch derivative has a degree of polymerization ranging from 50 to 500.

29. The method of claim 4, wherein the cellulose of said anionic starch derivative has a degree of esterification or etherification of from 0.5 to 1.2.

30. The method of claim [1] *32*, wherein the adjustment of pH occurs before addition of the hardening agent.

31. The method of claim [ 1 ] 32, wherein the adjustment of pH occurs after the addition of the hardening agent.

32. *In a method for producing oil-containing microcapsules by:*

(a) *emulsifying a water-immiscible oil and an aqueous solution containing gelatin and another hydrophilic colloid, or*

(b) *emulsifying a water-immiscible oil and an aqueous solution of a hydrophilic colloid to obtain a first sol, ionizable in water and admixing said first sol and an aqueous solution of a hydrophilic colloid to obtain a second sol, ionizable in water and having an electric charge opposite to that of said first sol, one of said colloids being gelatin,*

(c) *adding water to either emulsion derived from (a) or (b) and/or adjusting the pH thereof to cause coacervation, thus to obtain coacervates, wherein the complex colloids are deposited around the individual oil drops,*

(d) *cooling the coacervates to cause gelation thereof, and converting the pH to alkalinity, and*

(e) *adding a hardening agent to the system and adjusting the pH thereof to a range of from 7 to 11, the improvement which comprises:*

*adding an aqueous solution of a polyelectrolyte having anionic functional groups to the dispersion containing said coacervates at a temperature lower than the gelling point of the gelatin, in an amount sufficient to prevent a rise in viscosity thereof,*

*said addition being made after gelation of the coacervates has occurred and before the adjustment of said pH to a range of from 7 to 11 and the adding of said hardening agent to the system has occurred, and*

*said adjusting of said pH occurring before, after, or simultaneously with the addition of said hardening agent,*

*said polyelectrolyte being a member selected from the group consisting of*

*a modified cellulose comprising polysaccharides having beta-1,4-glucoside bonds of glucoses and having anionic functional groups,*

*an anionic starch derivative composed of a linear polysaccharide amylose formed by only alpha-1,4 bonds of D-glucose, and a branched polysaccharide amylopectin formed by mainly alpha-1,4 bonds of D-glucose and a partially side chain branched by alpha-1,6 bonds,*

*an anionic acid polysaccharide, obtained by polycondensing linearly D-galacturonic acid between the alpha-1,4 bonds thereof, said acid polysaccharide containing pectin, pectic acid, and pectinic acid,*

*a condensate of naphthalene sulfonic acid and formalin, which condensate is represented by the formula:*

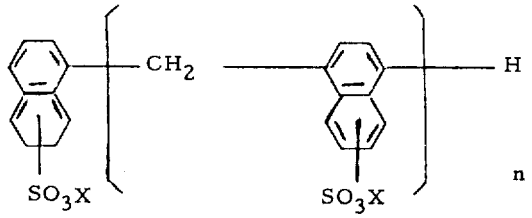

*wherein X is a hydrogen atom, an alkali metal, or an ammonium group, and n is a positive integer,*

*a hydroxyethyl cellulose derivative selected from the group consisting of the carboxymethyl ether of hydroxyethyl cellulose, hydroxyethyl cellulose sulfate, and hydroxyethyl cellulose phosphate,*

*a vinyl-benzene sulfonate copolymer selected from the group consisting of a vinylbenzene sulfonate-acryloylmorpholine copolymer, a vinylbenzene sulfonate-morpholino-methylacrylamide copolymer, a vinylbenzene sulfonate acrylamide copolymer, a vinylbenzene sulfonate-vinylpyrrolidone copolymer, and a vinylbenzene sulfonate-methyloxymethylacrylamide; said copolymer having the following group within its molecular structure:*

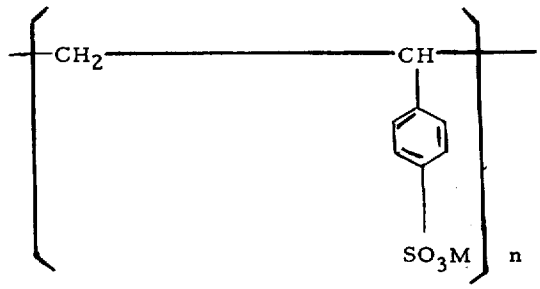

*wherein M is an alkali metal and n is a positive integer, and*

*an acrylic acid copolymer selected from the group consisting of an acrylic acid acryloylmorpholine copolymer, an acrylic acid-morpholinomethylacrylamide copolymer, an acrylic acid-acrylamide copolymer, an acrylic acid-vinylpyrrolidone copolymer, and an acrylic acid-methoxymethylacrylamide copolymer, said copolymer having the following group within its molecular structure:*

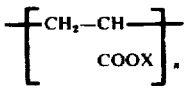

*wherein X is a hydrogen atom or an alkali metal and n is a positive integer.*

* * * * *